United States Patent
Wahl et al.

(10) Patent No.: US 11,047,317 B2
(45) Date of Patent: Jun. 29, 2021

(54) METHOD AND DEVICE FOR INFLUENCING THE ENGINE CONTROL OF A SINGLE-TRACK MOTOR VEHICLE

(71) Applicant: Robert Bosch GmbH, Stuttgart (DE)

(72) Inventors: Anja Wahl, Markgroeningen (DE); Florian Mayer, Ditzingen (DE); Horst Jung, Fellbach (DE); Markus Henzler, Stuttgart (DE); Matthias Klews, Tuebingen (DE); Uwe Wostradowski, Weil der Stadt-Merklingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/607,785

(22) PCT Filed: Mar. 22, 2018

(86) PCT No.: PCT/EP2018/057387
§ 371 (c)(1),
(2) Date: Oct. 24, 2019

(87) PCT Pub. No.: WO2018/219520
PCT Pub. Date: Dec. 6, 2018

(65) Prior Publication Data
US 2020/0200101 A1    Jun. 25, 2020

(30) Foreign Application Priority Data
May 31, 2017    (DE) .................. 102017209165.7

(51) Int. Cl.
*F02D 29/00*    (2006.01)
*F02D 41/02*    (2006.01)
(Continued)

(52) U.S. Cl.
CPC ............ *F02D 11/105* (2013.01); *F02D 29/02* (2013.01); *B60W 2710/0666* (2013.01);
(Continued)

(58) Field of Classification Search
CPC ...... F02D 11/105; F02D 41/021; F02D 11/10; F02D 29/00; F02D 41/02;
(Continued)

(56) References Cited

U.S. PATENT DOCUMENTS 10,668,902 B2 *    6/2020    Hirokami ............... B60T 8/1706
10,773,759 B2 *    9/2020    Haas ...................... B60W 30/02
(Continued)

FOREIGN PATENT DOCUMENTS

DE    102011017623 A1    10/2012
DE    102013001666 A1    7/2014
(Continued)

OTHER PUBLICATIONS

International Search Report for PCT/EP2018/057387, dated Jun. 6, 2018.

*Primary Examiner* — Thomas N Moulis
(74) *Attorney, Agent, or Firm* — Norton Rose Fulbright US LLP; Gerard Messina

(57) ABSTRACT

A method is described for influencing the engine control of a single-track motor vehicle, in which the current driving situation is ascertained, a predefined driving situation is selected from a specified class of predefined driving situations as a function of the current driving situation, and the engine control is influenced as a function of the selected predefined driving situation in a manner that is independent of the driver.

11 Claims, 1 Drawing Sheet

(51) Int. Cl.
*F02D 11/10* (2006.01)
*F02D 29/02* (2006.01)
(52) U.S. Cl.
CPC ...... *F02D 41/021* (2013.01); *F02D 2200/501* (2013.01); *F02D 2200/701* (2013.01); *F02D 2250/26* (2013.01)
(58) Field of Classification Search
CPC . B60W 2710/0666; B60W 2710/0672; B60W 2250/501; B60W 2200/701
See application file for complete search history.

(56) References Cited

U.S. PATENT DOCUMENTS

| | | | | |
|---|---|---|---|---|
| 10,810,810 | B2* | 10/2020 | Matsuda | G06F 16/29 |
| 2006/0219455 | A1* | 10/2006 | Watanabe | F02D 11/105 |
| | | | | 180/219 |
| 2014/0229082 | A1* | 8/2014 | Iizuka | B60W 10/06 |
| | | | | 701/54 |
| 2015/0096819 | A1* | 4/2015 | Grajkowski | F02D 11/105 |
| | | | | 180/170 |
| 2016/0061132 | A1* | 3/2016 | Hieda | B60K 31/0083 |
| | | | | 701/110 |
| 2016/0102646 | A1* | 4/2016 | Yamaguchi | F02P 5/045 |
| | | | | 701/113 |
| 2016/0137261 | A1* | 5/2016 | Ohashi | B62K 23/06 |
| | | | | 701/67 |
| 2016/0153379 | A1* | 6/2016 | Takaoka | F02P 5/1521 |
| | | | | 701/113 |
| 2016/0160763 | A1* | 6/2016 | Matsuda | B62K 11/00 |
| | | | | 123/403 |
| 2017/0101009 | A1* | 4/2017 | Hirokami | B60K 28/10 |
| 2017/0101081 | A1* | 4/2017 | Meier | B60T 8/171 |
| 2018/0216545 | A1* | 8/2018 | Kurata | F02D 41/30 |
| 2018/0370506 | A1* | 12/2018 | Igari | B60W 10/04 |

FOREIGN PATENT DOCUMENTS

| | | |
|---|---|---|
| DE | 102014215259 A1 | 2/2016 |
| EP | 2233388 A2 | 9/2010 |
| EP | 2993333 A1 | 3/2016 |
| JP | 2006214345 A | 8/2006 |

* cited by examiner

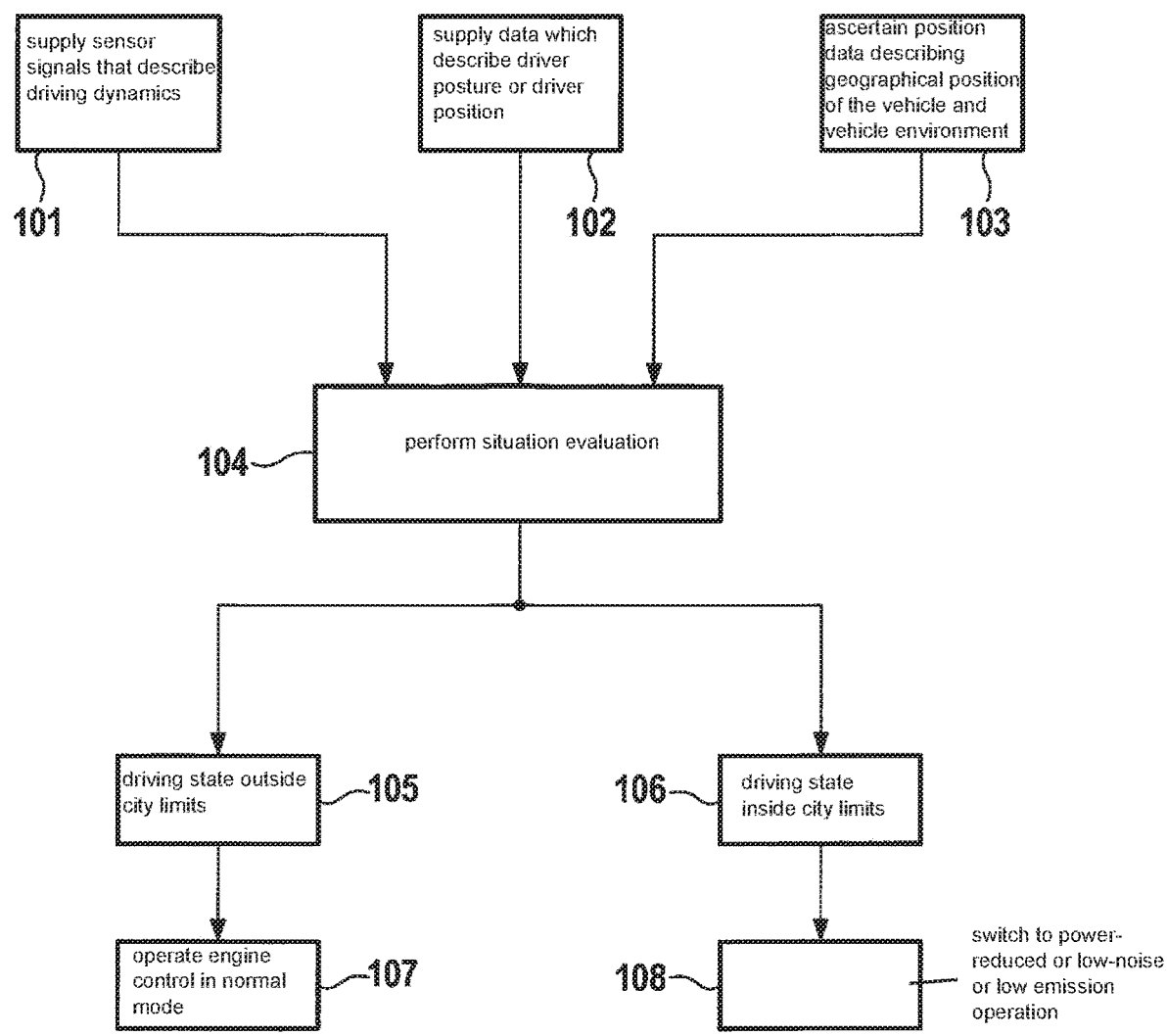

METHOD AND DEVICE FOR INFLUENCING THE ENGINE CONTROL OF A SINGLE-TRACK MOTOR VEHICLE

BACKGROUND INFORMATION

German Patent Application No. DE 10 2013 001 666 A1 describes a method and a device for adapting the driving behavior of a vehicle. In that case, a distinction is made between city traffic and highway driving and an automated adaptation of characteristic curves is carried out as a function thereof.

SUMMARY

The present invention relates to a method for influencing the engine control of a single-track motor vehicle, in which
the current driving situation is ascertained,
depending on the current driving situation, one of the predefined driving situations is selected from a specified class of predefined driving situations, and
the engine control is influenced as a function of the selected predefined driving situation in a manner that is independent of the driver.

In this way, in particular a driving style that is safe and suitable for the driving situation is to be made easier for the driver.

One advantageous embodiment of the present invention includes ascertaining the present driving situation based on current driving dynamics data of the motor vehicle and/or based on current position data of the motor vehicle and/or based on driver data that describes the current behavior of the driver.

In accordance with one advantageous further development of the present invention, the current driving dynamics data involve wheel-speeds and/or the longitudinal vehicle speed and/or the throttle valve setting and/or the braking pressure and/or acceleration values and/or yaw rate values.

In accordance with one advantageous further embodiment of the present invention, the position data are GPS data and/or video data and/or magnetic field data.

In accordance with one advantageous further development of the present invention, the driver data involve output signals of a seat-occupancy detection sensor or output signals of a handle-touch detection sensor or output signals of a footrest-occupancy detection sensor.

In accordance with one advantageous further development of the present invention, the predefined driving situations involve driving outside city limits and/or driving inside city limits and/or a turning situation and/or a U-turn situation and/or driving in a traffic-calmed zone and/or in stop-and-go traffic. In the mentioned situations, driver-independent influencing of the engine control is able to be used in a meaningful manner to ensure safety of the driver and the most optimal consideration of the environment.

In accordance with one advantageous further development of the present invention, the influencing of the engine control is achieved by a reduction or an increase of the engine torque requested via the throttle grip or by an actuation of the exhaust-gas flaps.

In accordance with one advantageous further development of the present invention, in the case of an impending U-turn or turning situation, the engine torque requested by the throttle grip is reduced.

In accordance with one advantageous further development of the present invention, in the case of driving in a traffic-calmed zone or driving in stop-and-go traffic, the engine torque requested via the throttle grip is reduced.

In accordance with one advantageous further development of the present invention, in the case of driving inside city limits, the exhaust-gas flaps are actuated in such a way that the noise emissions are reduced.

In accordance with one advantageous further development of the present invention, the single-track motor vehicle is a motorcycle.

In addition, the present invention includes a device which has means that are developed to carry out the method described above. In particular, this is a control unit in which the program code for carrying out the method according to the present invention is stored.

BRIEF DESCRIPTION OF THE DRAWINGS

FIG. 1 illustrates the basic structure of the present invention.

DETAILED DESCRIPTION OF EXAMPLE EMBODIMENTS

The present invention relates to the detection of driving situations and the use of a corresponding software for the automatic adaptation of the engine control, e.g., when inner-city driving is detected. Two-wheeled vehicles featuring a high engine output are frequently difficult to control in traffic-calmed zones, on narrow roads or in intersections or in stop-and-go traffic, and the output is able to be controlled only with difficulty. Undesired abrupt accelerations are able to be absorbed or prevented through an automatic adaptation of the engine control for a temporary reduction of the output and a reduced throttle grip acceptance. When driving within city limits is detected, the engine control is furthermore able to be adapted so that the lowest possible noise and harmful pollutants are emitted because the full power of the vehicle is usually not required in such a case.

The system detects different driving situations on the basis of current vehicle data such as wheel speed data, a speed, throttle valve setting, braking pressure, acceleration and yaw rate values, which are supplied via the CAN bus, as well as the determination of the vehicle position via GPS data, the detection of the driver position or driver movement, e.g., via an occupancy detection of the footrests. These driving situations are classified and evaluated for the purpose of an optimal adaptation of the engine control.

Exemplary Situation 1

If the system detects that the vehicle is traveling on a narrow road and if the driver signals through his actions, e.g., the reduction in speed, braking or steering interventions, that a turning or U-turn maneuver is imminent, then the system automatically adapts the engine control so that the output of the vehicle is reduced and more easily adjustable during the turning or U-turn maneuver.

Exemplary Situation 2

If the system detects that the vehicle is traveling in a traffic-calmed zone, a tempo-30 zone or in stop-and-go traffic and if the driver signals this through his actions, e.g., a sliding clutch or a discrepancy between the engine output and the actual requirement, then the engine control automatically adapts to the situation, e.g., by a slow drop in the engine torque gradient, and thereby prevents strong load changes. If the load change sets in abruptly and especially during slow cornering, then this can lead to critical situations and even to a fall.

Exemplary Situation 3

If the system detects that the vehicle is traveling on a city street, then the system automatically adapts to the situation, e.g., by adapting the engine control in order to reduce harmful emissions and/or an actuation of the exhaust-gas flaps in order to reduce noise.

FIG. 1 shows the basic structure of the present invention.

Blocks 101, 102 and 103 are used as inputs. Block 101 supplies sensor signals that describe the current driving dynamics, e.g., using acceleration sensors, yaw rate sensors or wheel speed sensors. Block 102 supplies data which describe the driver posture or driver position, e.g., using seat-occupancy detection sensors, footrest-occupancy detection sensors or handle-occupancy detection sensors. In block 103, position data describing the geographical position of the vehicle and the vehicle environment are ascertained, for instance with the aid of a GPS system, a video camera system or a magnetic field sensor system. The output data of blocks 101, 102 and 103 are supplied to block 104 in which a situation evaluation is performed. This may involve the two situations "inside city limits" and "outside city limits", for example. Block 105 characterizes a driving state outside city limits; block 106 characterizes a driving state inside city limits. Blocks 107 and 108 represent the engine control unit, which, for instance, is switched to a power-reduced or a low-noise or a low-emissions operation in block 108 because of the presence of a driving situation inside city limits. In block 107, the engine control units operates in a normal mode.

What is claimed is:

1. A method for influencing engine control of a single-track motor vehicle, the method comprising:
    ascertaining a current driving situation;
    selecting, depending on the current driving situation, a predefined driving situation from a specified class of predefined driving situations; and
    influencing an engine control of the single-track motor vehicle as a function of the selected predefined driving situation in a manner that is independent of the driver;
    wherein the current driving situation is ascertained based on current driving dynamics data of the motor vehicle, current position data of the motor vehicle, and driver data describing current driver behavior,
    wherein abrupt accelerations are absorbed or prevented by automatically adapting engine control for a temporary reduction of the output and a reduced throttle grip acceptance, and
    wherein if the vehicle is traveling in a traffic-calmed or residential zone or in stop-and-go traffic and if this is indicated by a sliding clutch or a discrepancy between the engine output and an actual requirement, then the engine control automatically adapts to the situation, by a drop in the engine torque gradient, to prevent an abrupt load change.

2. The method as recited in claim 1, wherein the current driving dynamics data include: (i) wheel speeds, and/or (ii) longitudinal vehicle speed, and/or (iii) throttle valve setting, and/or (iv) braking pressure, and/or (v) acceleration values, and/or (vi) yaw rate values.

3. The method as recited in claim 1, wherein the position data are: (i) GPS data, and/or (ii) video data, and/or (iii) magnetic field data.

4. The method as recited in claim 1, wherein the driver data include: (i) output signals of a seat-occupancy detection sensor, or (ii) output signals of a handle-touch detection sensor, or (iii) output signals of a footrest-occupancy detection sensor.

5. The method as recited in claim 1, wherein the predefined driving situations include: (i) driving outside city limits, and/or (ii) driving inside city limits, and/or (iii) a turning situation, and/or (iv) a U-turn situation, and/or (v) driving in a traffic-calmed zone, and/or (vi) driving in stop-and-go traffic.

6. The method as recited in claim 1, wherein the influencing of the engine control is achieved by: (i) a reduction of engine torque requested via a throttle grip, or (ii) an increase of the engine torque requested via the throttle grip, or (iii) an actuation of exhaust-gas flaps.

7. The method as recited in claim 6, wherein in the case of an impending U-turn or turning situation, the engine torque requested by the throttle grip is reduced.

8. The method as recited in claim 6, wherein in the case of driving in a traffic-calmed zone or driving in stop-and-go traffic, the engine torque requested via the throttle grip is reduced.

9. The method as recited in claim 6, wherein in the case of driving inside city limits, the exhaust-gas flaps are actuated so that the noise emissions are reduced.

10. The method as recited in claim 1, wherein the single-track motor vehicle is a motorcycle.

11. An apparatus for influencing engine control of a single-track motor vehicle, comprising:
    a device configured to perform the following:
        ascertaining a current driving situation;
        selecting, depending on the current driving situation, a predefined driving situation from a specified class of predefined driving situations; and
        influencing an engine control of the single-track motor vehicle as a function of the selected predefined driving situation in a manner that is independent of the driver;
        wherein the current driving situation is ascertained based on current driving dynamics data of the motor vehicle, current position data of the motor vehicle, and driver data describing current driver behavior.

* * * * *